United States Patent
Nemshick et al.

(10) Patent No.: US 7,477,471 B1
(45) Date of Patent: Jan. 13, 2009

(54) DISK DRIVE EMPLOYING OFFSET COMPENSATION FOR VELOCITY CONTROL OF A VOICE COIL MOTOR

(75) Inventors: Steven Nemshick, Santa Ana, CA (US); Craig R. Huddleston, Newport Beach, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 103 days.

(21) Appl. No.: 11/788,507

(22) Filed: Apr. 20, 2007

(51) Int. Cl.
*G11B 21/02* (2006.01)
*G11B 5/596* (2006.01)

(52) U.S. Cl. .................... 360/75; 360/78.04; 360/78.12
(58) Field of Classification Search ........................ None
See application file for complete search history.

(56) References Cited

U.S. PATENT DOCUMENTS

| | | | |
|---|---|---|---|
| 5,982,130 A | 11/1999 | Male | |
| 6,690,536 B1 | 2/2004 | Ryan | |
| 6,795,268 B1 | 9/2004 | Ryan | |
| 6,826,007 B1 * | 11/2004 | Patton, III | ................ 360/78.06 |
| 6,867,944 B1 | 3/2005 | Ryan | |
| 6,900,959 B1 | 5/2005 | Gardner et al. | |
| 7,106,022 B2 | 9/2006 | Brenden et al. | |
| 2007/0282551 A1 * | 12/2007 | Harmer et al. | ................ 702/94 |

* cited by examiner

*Primary Examiner*—Andrew L. Sniezek
(74) *Attorney, Agent, or Firm*—Howard H. Sheerin, Esq.

(57) ABSTRACT

A disk drive is disclosed employing a VCM control loop comprising a voltage detector operable to detect a back EMF voltage across a voice coil of a voice coil motor, a current detector operable to detect a current flowing through the voice coil, and a control voltage generator, responsive to a command input and the detected back EMF voltage, operable to generate a control voltage applied to the voice coil. Control circuitry within the disk drive (a) initializes the control voltage; (b) injects a transient into the VCM control loop and detects a corresponding current flowing through the voice coil; (c) adjusts the control voltage in response to a polarity of the detected current; (d) repeats elements (b) and (c) at least once; and (e) stores an offset value in response to the adjusted control voltage.

25 Claims, 9 Drawing Sheets

DISK DRIVE EMPLOYING OFFSET COMPENSATION FOR VELOCITY CONTROL OF A VOICE COIL MOTOR

BACKGROUND

1. Field

The present invention relates to disk drives for computer systems. In particular, the present invention relates to a disk drive employing offset compensation for velocity control of a voice coil motor.

2. Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

There are times when the servo control system does not have access to the embedded servo sectors yet it is still desirable to control the velocity of the actuator arm. For example, in disk drives employing ramp loading/unloading, it is desirable to control the velocity of the actuator arm so that the head is not damaged as it travels off the ramp onto the disk as well as off the disk onto the ramp. Another example is if the servo control system loses servo sector synchronization it is desirable to control the velocity of the actuator arm to facilitate re-synchronizing to the servo sectors.

Prior art techniques for controlling the velocity of the actuator arm when servo sector information is unavailable include using a voltage loop with the detected back EMF voltage generated by the VCM as the feedback. The voltage across the voice coil (the voice coil voltage) comprises a component due to the inductance L of the VCM, a component due to the resistance R of the VCM, and a component due to the velocity of the VCM referred to as the back EMF voltage. If the component due to the resistance R is canceled from the voice coil voltage, at low frequencies Ldi/dt is small leaving the back EMF voltage due to the velocity of the VCM as the dominant component.

Various analog components, such as differential operational amplifiers (op-amps) are typically employed in the feedback loop, for example to detect the voice coil voltage and/or the current flowing through a sense resistor in series with the voice coil. The various analog components may have a non-zero input offset voltage that can distort the back EMF measurement. A known technique for determining the input offset voltage involves zeroing the input to the op amp that measures the voice coil voltage and adjusting the control voltage until the detected current flowing through the sense resistor is zero. The control voltage that generates the detected zero current is then used to adjust the control voltage during normal operation in order to compensate for the offset. However, this technique may not account for the offset voltage of the current sensing op-amp, and/or it may be obfuscated by quantization error and/or signal noise that may vary depending on the ambient temperature.

There is, therefore, a need to improve the back EMF voltage measurement of a VCM in order to improve the velocity control mode of a disk drive.

SUMMARY OF THE EMBODIMENTS OF THE INVENTION

An embodiment of the present invention comprises a disk drive comprising a disk, a head, a voice coil motor (VCM) comprising a voice coil operable to actuate the head radially over the disk, the voice coil comprising a first end and a second end. The disk drive further comprises a VCM control loop including a voltage detector operable to detect a back EMF voltage across the voice coil, a current detector operable to detect a current flowing through the voice coil, and a control voltage generator, responsive to a command input and the detected back EMF voltage, operable to generate a control voltage applied to the voice coil. Control circuitry within the disk drive (a) initializes the control voltage; (b) injects a transient into the VCM control loop and detects a corresponding current flowing through the voice coil; (c) adjusts the control voltage in response to a polarity of the detected current; (d) repeats elements (b) and (c) at least once; and (e) stores an offset value in response to the adjusted control voltage.

In one embodiment, the control voltage generator is responsive to the stored offset value to generate the control voltage.

In another embodiment, the control circuitry adjusts the control voltage relative to a delta value. In one embodiment, the control circuitry adjusts the delta value when the polarity of the detected current changes sign, and in one embodiment, the control circuitry decreases the delta value when the polarity of the detected current changes sign.

In yet another embodiment, the control circuitry injects the transient into the VCM control loop by injecting a transient into the detected back EMF voltage. For example, in one embodiment the disk drive comprises an IR voltage detector, responsive to the detected current, operable to detect a resistive voltage due to a resistance of the voice coil, and a voltage compensator for adjusting the detected back EMF voltage in response to the detected resistive voltage, wherein the control circuitry injects the transient into the detected back EMF voltage by adjusting the IR voltage detector. In one embodiment, the IR voltage detector comprises a variable resistor representing a resistance estimate of the voice coil, and the control circuitry injects the transient into the detected back EMF voltage by adjusting the variable resistor. In one embodiment, the control circuitry injects the transient into the detected back EMF voltage by increasing a resistance of the variable resistor.

In still another embodiment, the control circuitry is further operable to tristate the voice coil for a tristate interval after detecting the current flowing through the voice coil.

In another embodiment, the current detector comprises a variable resistor, and the control circuitry injects the transient into the VCM control loop by adjusting the variable resistor.

In yet another embodiment, the control circuitry injects the transient into the VCM control loop by adjusting a gain of an amplifier.

Another embodiment of the present invention comprises a method of operating a voice coil motor (VCM) control loop in a disk drive, the disk drive comprising a disk, a head, a VCM comprising a voice coil operable to actuate the head radially over the disk, the voice coil comprising a first end and a second end. The method comprises:

(a) initializing a control voltage applied to the voice coil;

(b) detecting a back EMF voltage across the voice coil;
(c) injecting a transient into the VCM control loop and detecting a corresponding current flowing through the voice coil;
(d) adjusting the control voltage in response to a polarity of the detected current;
(e) repeating elements (b) through (d) at least once; and
(f) storing an offset value in response to the adjusted control voltage.

DETAILED DESCRIPTION OF EMBODIMENTS OF THE INVENTION

Figures 1A, 1B:
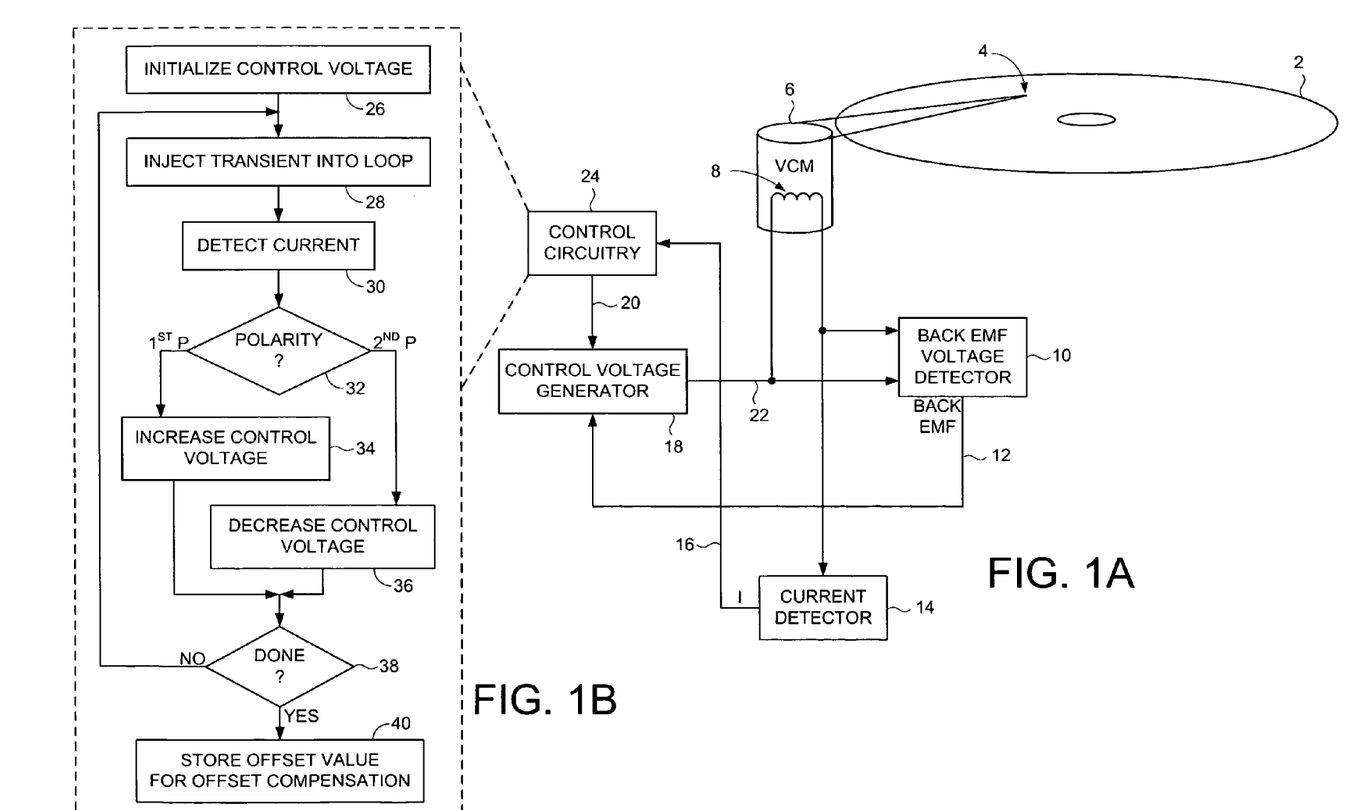
FIG. 1A shows a disk drive according to an embodiment of the present invention comprising a VCM for actuating a head over the disk, a back EMF voltage detector, a current detector, and a control voltage generator, responsive to a command input and the detected back EMF voltage, operable to generate a control voltage applied to the voice coil.
FIG. 1B is a flow diagram according to an embodiment of the present invention for calibrating an offset voltage for use in a velocity control of the VCM.

FIG. 1A shows a disk drive according to an embodiment of the present invention comprising a disk 2, a head 4, a voice coil motor (VCM) 6 comprising a voice coil 8 operable to actuate the head 4 radially over the disk 2, the voice coil 8 comprising a first end and a second end. The disk drive further comprises a VCM control loop including a voltage detector 10 operable to detect a back EMF voltage 12 across the voice coil 8, a current detector 14 operable to detect a current 16 flowing through the voice coil 8, and a control voltage generator 18, responsive to a command input 20 and the detected back EMF voltage 12, operable to generate a control voltage 22 applied to the voice coil.

Control circuitry 24 within the disk drive executes the flow diagram shown in FIG. 1B to calibrate an offset value for the circuitry shown in FIG. 1A according to an embodiment of the present invention, wherein at step 26 the control voltage is initialized to a suitable value (e.g., zero). At step 28 a transient is injected into the VCM control loop, and at step 30 a corresponding current flowing through the voice coil is detected. The control circuitry 24 may inject a transient into the VCM control loop at step 28 in any suitable manner, such as adjusting the voltage detector 10, the current detector 14, and/or the control voltage generator 18. At step 32 a polarity of the detected current is evaluated, wherein the control voltage is increased if the detected current is a first polarity at step 34, or the control voltage is decreased if the detected current is a second polarity at step 36. The flow diagram of FIG. 1B is repeated at least once starting at step 28 until a predetermined condition is satisfied at step 38. For example, in one embodiment the flow diagram is repeated until the polarity of the detected current changes sign. At step 40 an offset value is stored in response to the adjusted control voltage for use in offset compensation during normal operation. For example, in one embodiment the offset value is selected at step 40 as a value that will generate the adjusted control voltage value at the end of the calibration procedure.

Figure 2:
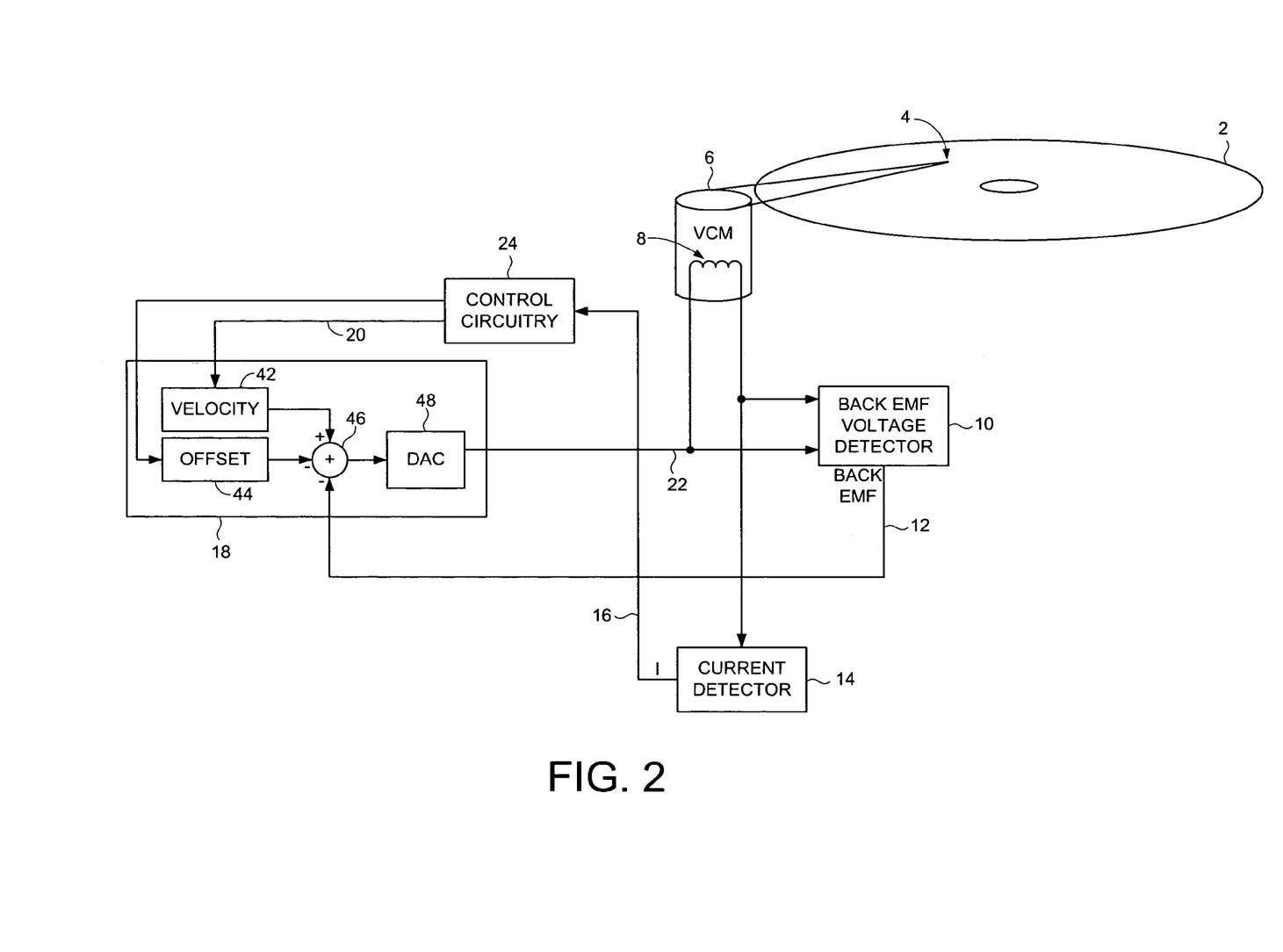
FIG. 2 shows an embodiment of the present invention wherein the control voltage generator is responsive to the stored offset value to generate the control voltage applied to the VCM.

FIG. 2 shows a disk drive according to an embodiment of the present invention wherein the control voltage generator 18 comprises a register 42 for storing the command input 20 representing a target velocity of the VCM 6, a register 44 for storing the offset value, and an adder 46 for combining the command input 20, the offset value 44, and the detected back EMF voltage 12. The output of adder 46 is converted by a digital-to-analog converter (DAC) 48 into the control voltage 22 applied to the VCM 6. In one embodiment, the control circuitry 24 adjusts the control voltage 22 (at steps 34 and 36 of FIG. 1B) by adjusting the command input 20 value stored in register 42. At the end of the calibration procedure (at step 40 of FIG. 1B), the control circuitry copies the command input 20 value stored in register 42 to the offset value register 44. In an alternative embodiment, the control circuitry 24 adjusts the control voltage 22 by adjusting the offset value stored in register 44 so that register 44 stores the correct offset value at the end of the calibration procedure.

Figure 3:
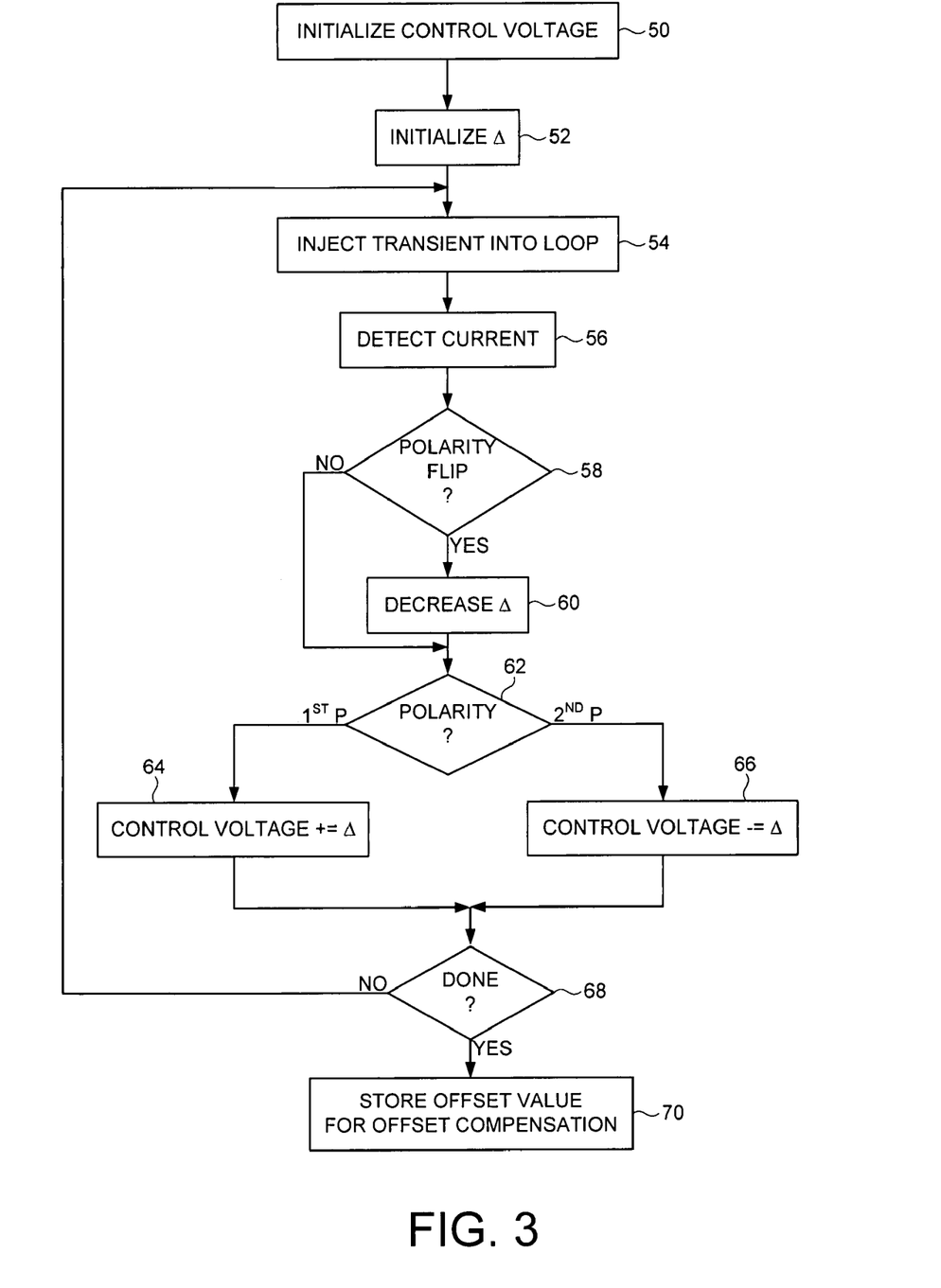
FIG. 3 is a flow diagram according to an embodiment of the present invention wherein the control voltage applied to the VCM is adjusted by a delta which is decreased when the polarity of the detected current changes sign.

FIG. 3 shows a flow diagram implemented by the control circuitry 24 according to an embodiment of the present invention wherein at step 50 the control voltage is initialized to a suitable value (e.g., zero), and at step 52 a delta (Δ) is initialized to a suitable value (e.g., a maximum value). At step 54 a transient is injected into the VCM control loop, and at step 56 a corresponding current flowing through the voice coil is detected. If at step 58 the polarity of the detected current changes sign (relative to the previous detected value), then at step 60 the delta is decreased. At step 64 the control voltage is increased by the delta if the detected current has a first polarity at step 62, or the control voltage is decreased by the delta at step 66 if the detected current has a second polarity. At step 68 the flow diagram of FIG. 3 is repeated at least once starting at step 54, and then at step 70 the offset value is stored in response to the adjusted control voltage. In one embodiment, the flow diagram of FIG. 3 is repeated until a suitable condition is detected, such as the delta falling below a predetermined threshold, or remaining at or below the threshold for a number of iterations. Adjusting the control voltage by a delta that decreases each time the polarity of the detected current changes sign helps decrease the calibration time by converging faster to the correct offset value.

Figure 4:
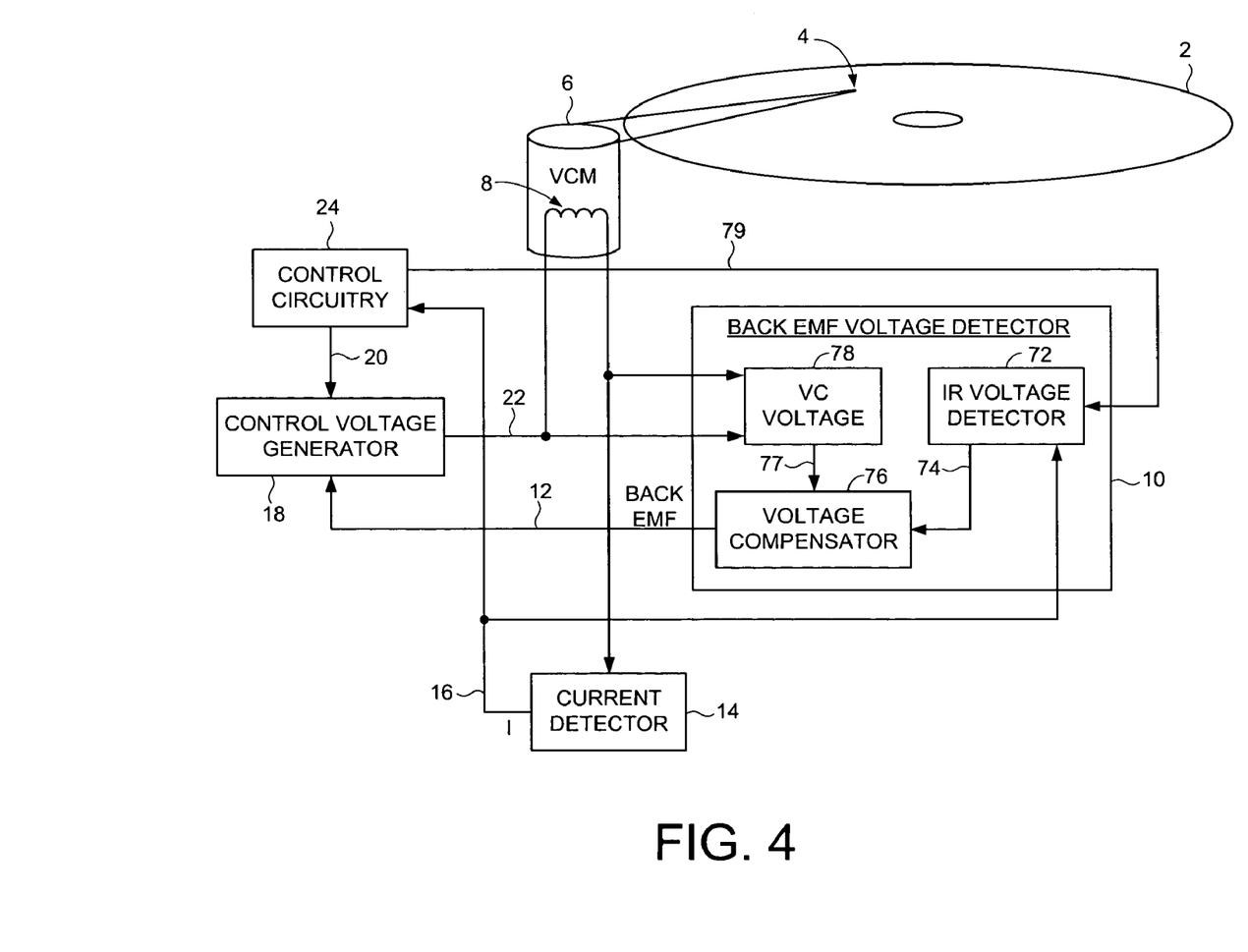
FIG. 4 shows a disk drive according to an embodiment of the present invention wherein the back EMF voltage detector comprises an IR voltage detector operable to detect a resistive voltage representing a resistance of the VCM, and a voltage compensator for adjusting the detected back EMF voltage in response to the resistive voltage.

In an embodiment shown in FIG. 4, the voltage detector 10 comprises an IR voltage detector 72, responsive to the detected current 16, operable to detect a resistive voltage 74 due to a resistance of the voice coil 8, and a voltage compensator 76 operable to adjust the detected back EMF voltage 12 in response to the detected resistive voltage 74. For example, the voltage compensator 76 may subtract the resistive voltage 74 from the voice coil voltage 77 detected by a voice coil voltage detector 78 in order to cancel the resistive voltage due to the resistance of the voice coil 8 so that the adjusted back EMF voltage 12 more accurately represents the velocity of the VCM 6. In one embodiment, the control circuitry 24 injects the transient into the VCM control loop by injecting a transient into the detected back EMF voltage 12, for example, by adjusting the IR voltage detector 72, for example, by adjusting a variable resistor within the IR voltage detector 72 over control line 79.

Figure 5:
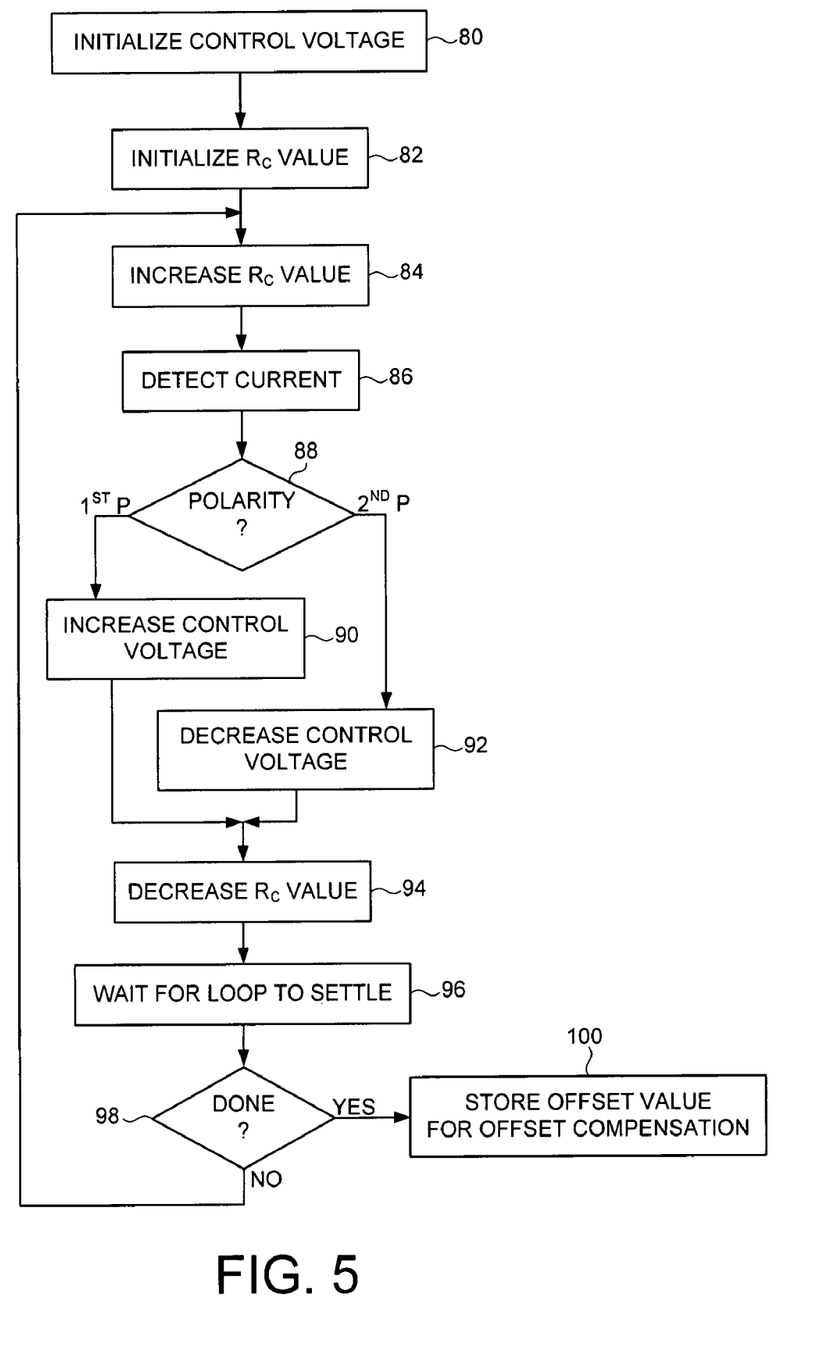
FIG. 5 is a flow diagram according to an embodiment of the present invention wherein a variable resistor of the IR voltage detector is adjusted to inject a transient into the detected back EMF voltage.

FIG. 5 is a flow diagram implemented by the control circuitry 24 according to an embodiment of the present invention wherein at step 80 the control voltage is initialized to a suitable value (e.g., zero), and at step 82 a variable resistor $R_c$ within the IR voltage detector 72 is initialized to a suitable value (e.g., a minimum value). At step 84 a transient is injected into the detected back EMF voltage by increasing the value of the variable resistor $R_c$, and at step 86 a corresponding current flowing through the voice coil is detected. At step 88 a polarity of the detected current is evaluated, wherein the control voltage is increased if a first polarity at step 90, or the control voltage is decreased if a second polarity at step 92. At step 94 the value of the variable resistor $R_c$ is decreased, and at step 96 there is a delay to wait for the control loop to settle (e.g., to allow the current to decay out of the voice coil 8). The flow diagram of FIG. 5 is repeated at least once starting at step 84 until a predetermined condition is satisfied at step 98. For example, in one embodiment the flow diagram is repeated until the polarity of the detected current changes sign. At step 100 the offset value is stored in response to the adjusted control voltage.

In one embodiment, at step 86 of FIG. 5 the polarity of the current is not detected until the magnitude of the current exceeds a threshold to ensure the validity of the measurement. In one embodiment, a threshold is selected that ensures a valid measurement but also ensures that the magnitude of the current does not cause the VCM 6 to move. Once the magnitude of the current exceeds the threshold, the polarity of the current is detected and then the value of the variable resistor $R_c$ decreased immediately (step 94) to prevent the current from rising further. In other words, in one embodiment step 94 of FIG. 5 is performed immediately following step 86 to prevent the current from rising any further.

Figure 6:
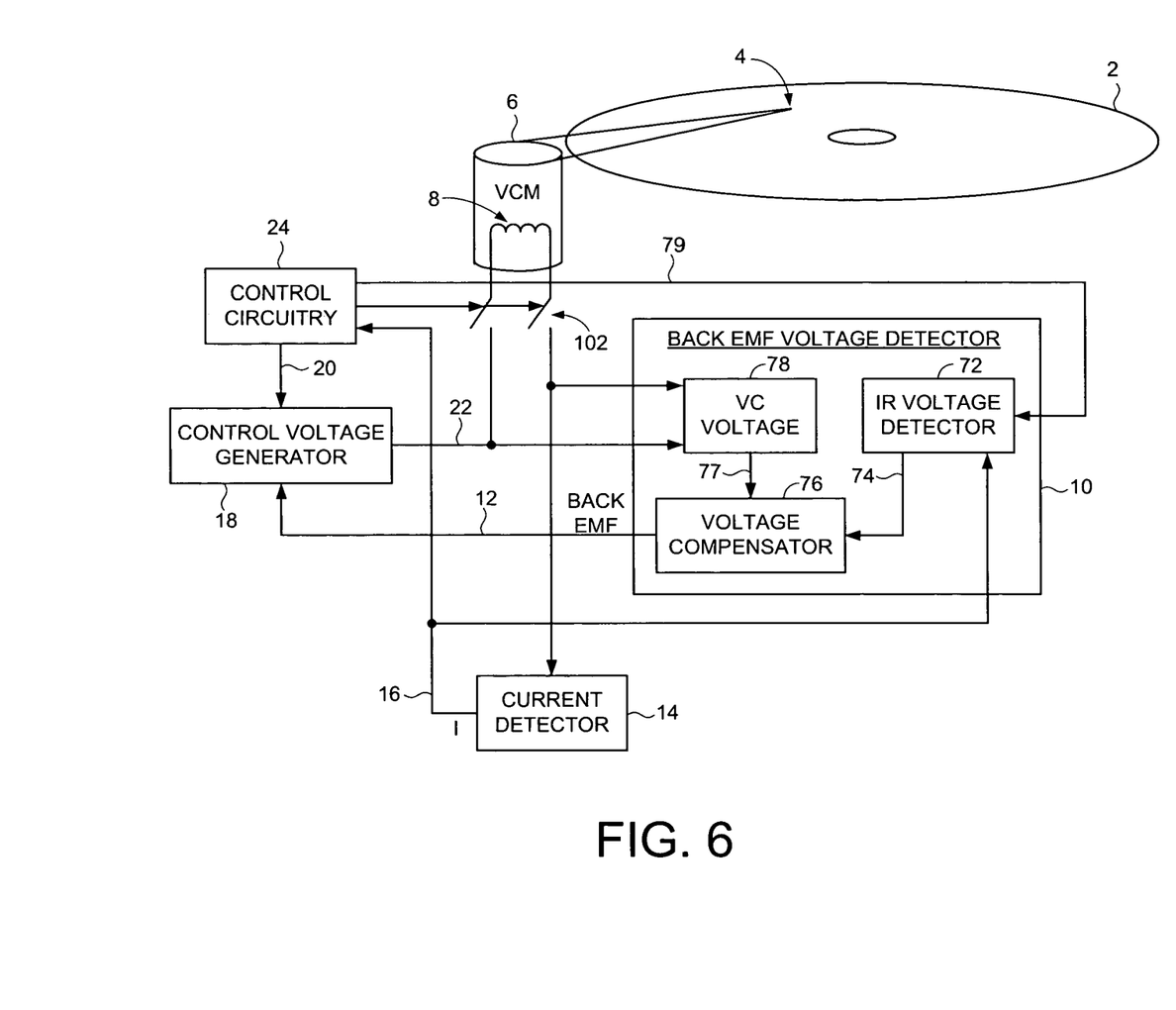
FIG. 6 shows a disk drive according to an embodiment of the present invention wherein the VCM is tristated for a tristate period.

FIG. 6 shows an embodiment of the present invention wherein the control circuitry 24 tristates the voice coil 8 for a tristate interval after detecting the current flowing through the voice coil 8. The control circuitry 24 opens a switch 102 at each end of the voice coil 8 in order to tristate the voice coil 8, wherein the switch 102 may comprise any suitable circuitry, such as a suitable transistor. In one embodiment, tristating the voice coil 8 comprises completely disconnecting the voice coil 8 from the circuitry shown in FIG. 4, and in an alternative embodiment described below with reference to FIG. 8, tristating the voice coil 8 comprises disconnecting the voice coil 8 from the drivers. Tristating the voice coil 8 for a tristate interval causes the current flowing through the voice coil 8 to decay almost instantaneously, which enables the interval between iterations to be reduced, thereby reducing the time required to perform the calibration procedure. A suitable tristate interval is selected that is long enough to ensure the current flowing through the voice coil will decay substantially to zero, but short enough to limit discharging the capacitors that implement the control loop.

Figure 7:
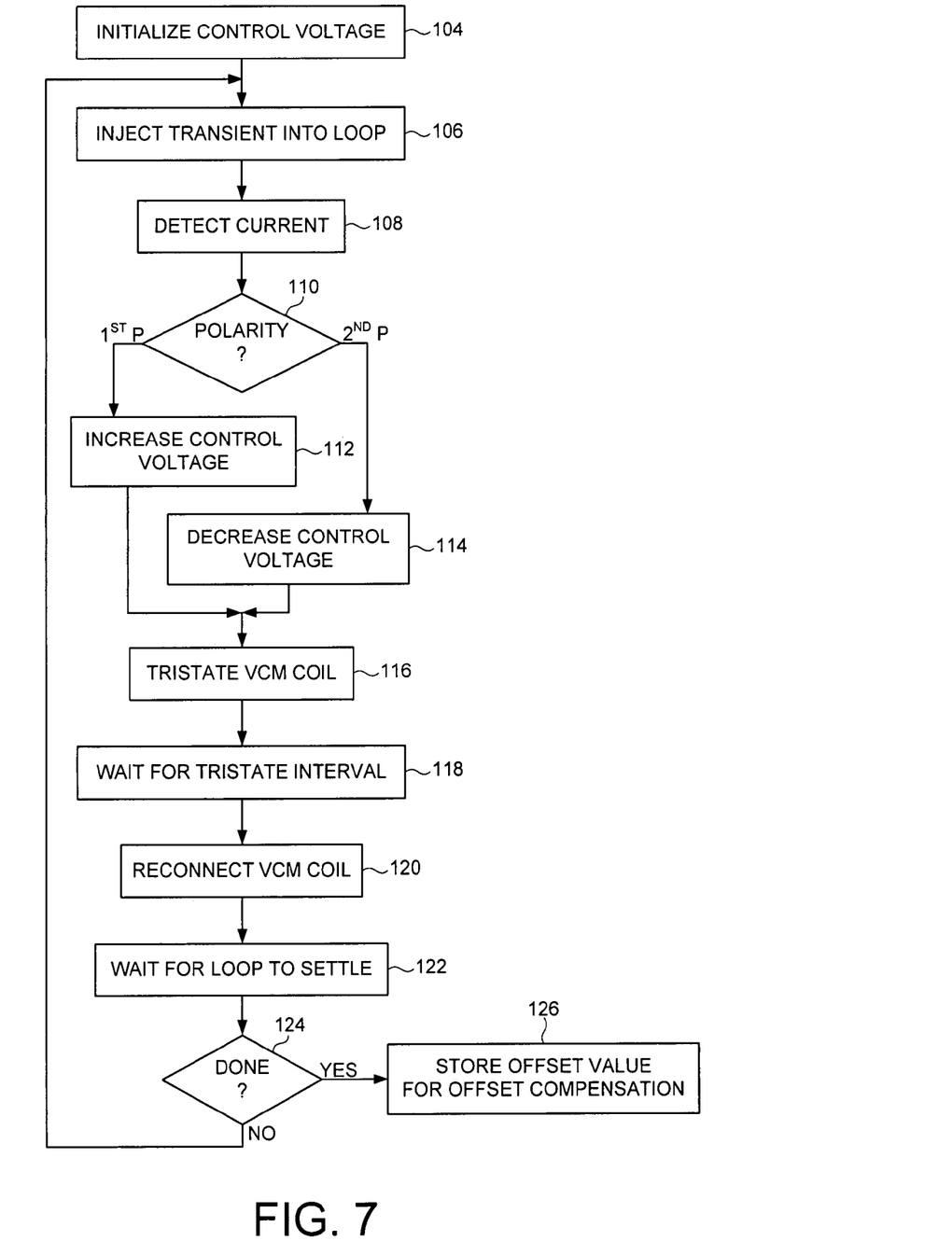
FIG. 7 is flow diagram according to an embodiment of the present invention wherein the VCM is tristated for a tristate period after injecting the transient into the back EMF voltage and detecting the current.

FIG. 7 is a flow diagram implemented by the control circuitry 24 according to an embodiment of the present invention wherein at step 104 the control voltage is initialized to a suitable value (e.g., zero). At step 106 a transient is injected into the VCM control loop, and at step 108 a corresponding current flowing through the voice coil is detected. At step 110 a polarity of the detected current is evaluated, wherein the control voltage is increased if a first polarity at step 112, or the control voltage is decreased if a second polarity at step 114. At step 116 the control circuitry 24 tristates the voice coil 8 and waits at step 118 for a tristate interval in order to discharge the current from the voice coil 8. At step 120 the control circuitry 24 reconnects the voice coil 8 to the control voltage and at step 122 waits for the control loop to settle (e.g., waits for the capacitors in the control loop to recharge). The flow diagram of FIG. 7 is repeated at least once starting at step 106 until a predetermined condition is satisfied at step 124. For example, in one embodiment the flow diagram is repeated until the polarity of the detected current changes sign. At step 126 the offset value is stored in response to the adjusted control voltage.

Figure 8:
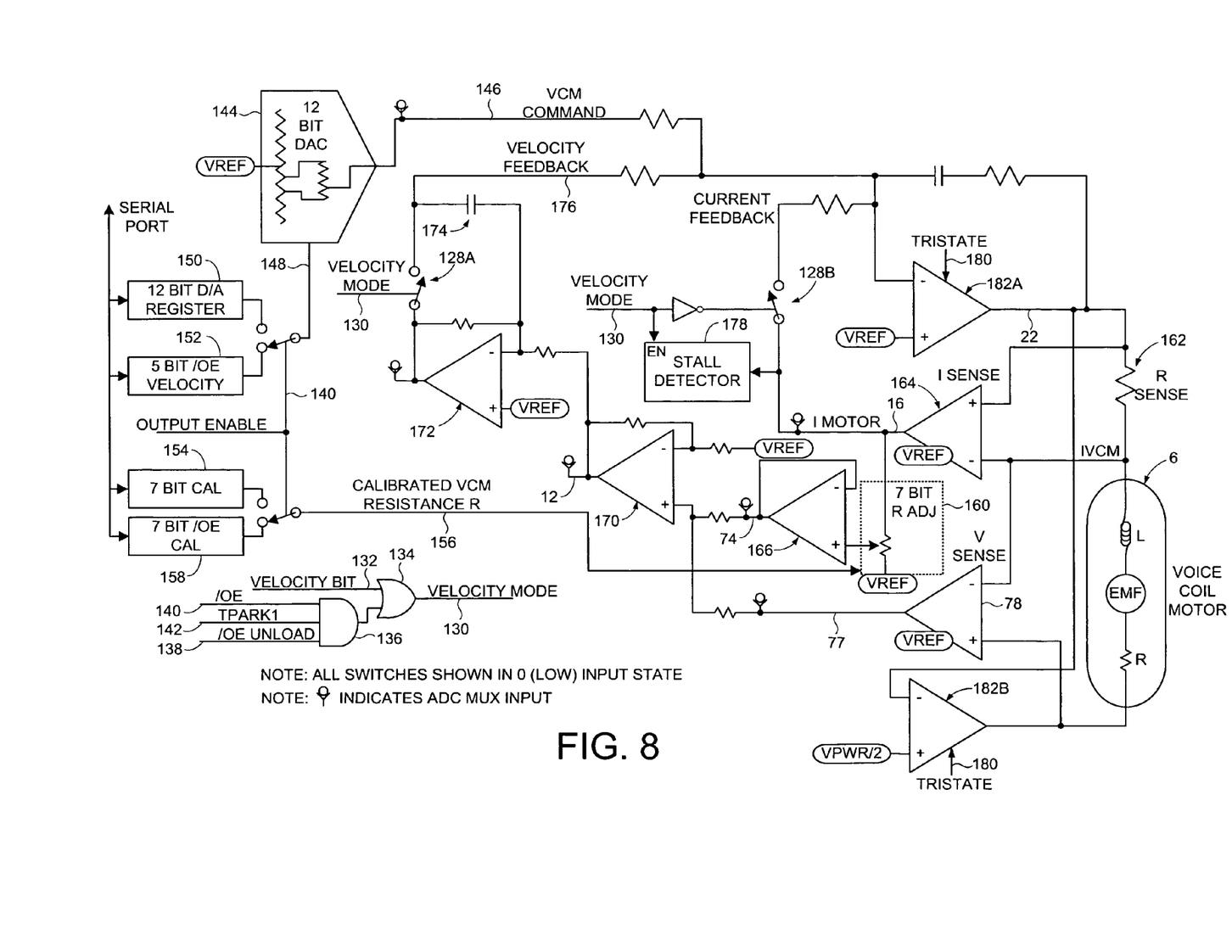
FIG. 8 is a circuit diagram according to an embodiment of the present invention including a plurality of op-amps for implementing the back EMF voltage detector, current detector, and IR voltage detector.

FIG. 8 shows suitable circuitry according to an embodiment of the present invention for implementing the back EMF voltage detector 10, current detector 14, and control voltage generator 18 of FIG. 1A. The circuit of FIG. 8 operates in a normal operating mode wherein the VCM 6 is driven by a current controlled feedback loop, and in a velocity control mode wherein the VCM 6 is driven by a voltage controlled feedback loop. When in the normal operating mode, switch 128A is opened and switched 128B is closed to configure the current feedback loop, and when in the velocity control mode, switch 128A is closed and switch 128B is opened to configure the voltage feedback loop. A velocity mode control signal 130 configures the switches 128A and 128B for velocity control mode when the embedded servo information is not available for servo controlling the VCM 6. A velocity bit 132 is set by the control circuitry 24 to activate the velocity mode control signal 130 via OR gate 134. The velocity bit 132 may be set during controlled modes of operation, such as during a load/unload operation or when synchronization to the embedded servo data is lost. The velocity mode control signal 130 may also be activated via AND gate 136 and OR gate 134 during power down or power failure. If the OE UNLOAD signal 138 has been preset to configure the drive for velocity mode unload, when a power down or power failure is detected, the control signals OUTPUT ENABLE (OE) 140 and TPARK1 142 are automatically activated, thereby activating the velocity mode control signal 130.

A digital-to-analog converter (DAC) 144 generates an analog VCM command signal 146 in response to a digital command input signal 148. A digital register 150 is programmed with an operating command input during normal operation, and a digital register 152 is programmed with a velocity mode command input used during power down or power failure to park the head 4. A digital register 154 stores a calibrated VCM resistance R value 156 for use during velocity control mode when the velocity bit 132 is activated (e.g., when calibrating the detected IR voltage 74). After calibrating the detected IR voltage 74, a digital register 158 stores the calibrated VCM resistance R value 156 for use during power down or power failure. The calibrated VCM resistance R value 156 is used to program a variable resistor 160 in order to calibrate the detected IR voltage 74. For more information on calibrating the IR voltage 74, see U.S. Pat. No. 6,690,536 "DISK DRIVE EMPLOYING VCM DEMAND CURRENT TO CALIBRATE VCM IR VOLTAGE FOR VELOCITY CONTROL OF AN ACTUATOR ARM" and U.S. Pat. No. 6,795,268 "DISK DRIVE EMPLOYING SEEK TIME VCM IR VOLTAGE CALIBRATION FOR VELOCITY CONTROL OF AN ACTUATOR ARM" the disclosures of which are incorporated herein by reference.

A sense resistor 162 and amplifier 164 implement a suitable current detector 14 for generating a voltage representing the current 16 flowing through the voice coil 8. With the voltage representing the current 16 applied to the variable resistor 160, the output of amplifier 166 is the calibrated IR voltage 74. An amplifier 78 measures the voltage 77 across the voice coil 8. The IR voltage 74 is subtracted from the voice coil voltage 77 and amplified at amplifier 170 such that the output voltage of amplifier 170 is the detected back EMF voltage 12. The detected back EMF voltage 12 is filtered by amplifier 172 and capacitor 174 to generate a velocity feed back voltage 176 representative of the velocity of the VCM 6. The velocity feedback voltage 176 is subtracted from the VCM command signal 146 to generate the control voltage 22 applied to the voice coil 8. In the embodiment shown in FIG. 8, a stall detector 178 monitors the current 16 flowing through the voice coil 8 to detect when the VCM 6 has stalled. Details of suitable circuitry for implementing the stall detector 178 are shown in U.S. Pat. No. 6,867,944 entitled "DISK DRIVE COMPRISING VCM STALL DETECTOR FOR VELOCITY CONTROL OF AN ACTUATOR ARM" the disclosure of which is incorporated herein by reference.

When calibrating the offset value for the circuitry shown in FIG. 8, the OUTPUT ENABLE (OE) signal 140 is deactivated so that the output of register 150 controls the DAC 144 and the output of register 154 controls the variable resistor 160. The control circuitry 24 initializes the control voltage 22 at step 26 of FIG. 1B by programming register 150 with a suitable value (e.g., zero). The control circuitry 24 injects the transient into the VCM control loop at step 28 of FIG. 1B by programming register 154 with a maximum value. In one embodiment, the control circuitry 24 detects the corresponding current flowing through the voice coil 8 at step 30 of FIG. 1B by sampling signal 16 using a suitable analog-to-digital converter (ADC). In an alternative embodiment, the stall detector 178 is used to compare the detected current 16 to positive and negative thresholds. The control circuitry 24 increases/decreases the control voltage 22 at steps 34 and 36 of FIG. 1B by increasing/decreasing the value programmed into register 150. The control circuitry 24 then decreases the value stored in register 154 (and optionally tristates the voice coil 8 for a tristate interval), waits for the control loop to settle, and then performs another iteration of the offset calibration procedure. In the embodiment of FIG. 8, the control circuitry 24 tristates the voice coil 8 by enabling a tristate signal 180 which opens the driving transistors of an H-bridge circuit implemented by amplifiers 182A and 182B, thereby allowing the voice coil current to discharge through the fly-back diodes of the H-bridge circuit. Since tristating the voice coil 8 is an optional embodiment, the enable signal 180 shown in FIG. 8 is optional.

When the calibration procedure ends at step 38 of FIG. 1B, the last value programmed into register 150 represents the offset value stored at step 40. In the embodiment of FIG. 8, the control circuitry 24 stores the offset value in a suitable format (e.g., in a register or as a firmware variable). When controlling the VCM 6 in the velocity control mode during normal operation, the control circuitry 24 adjusts the command input 20 of FIG. 1A using the stored offset value (e.g., by subtracting the offset value), and the adjusted command input 20 is then programmed into register 150 of FIG. 8.

Figure 9:
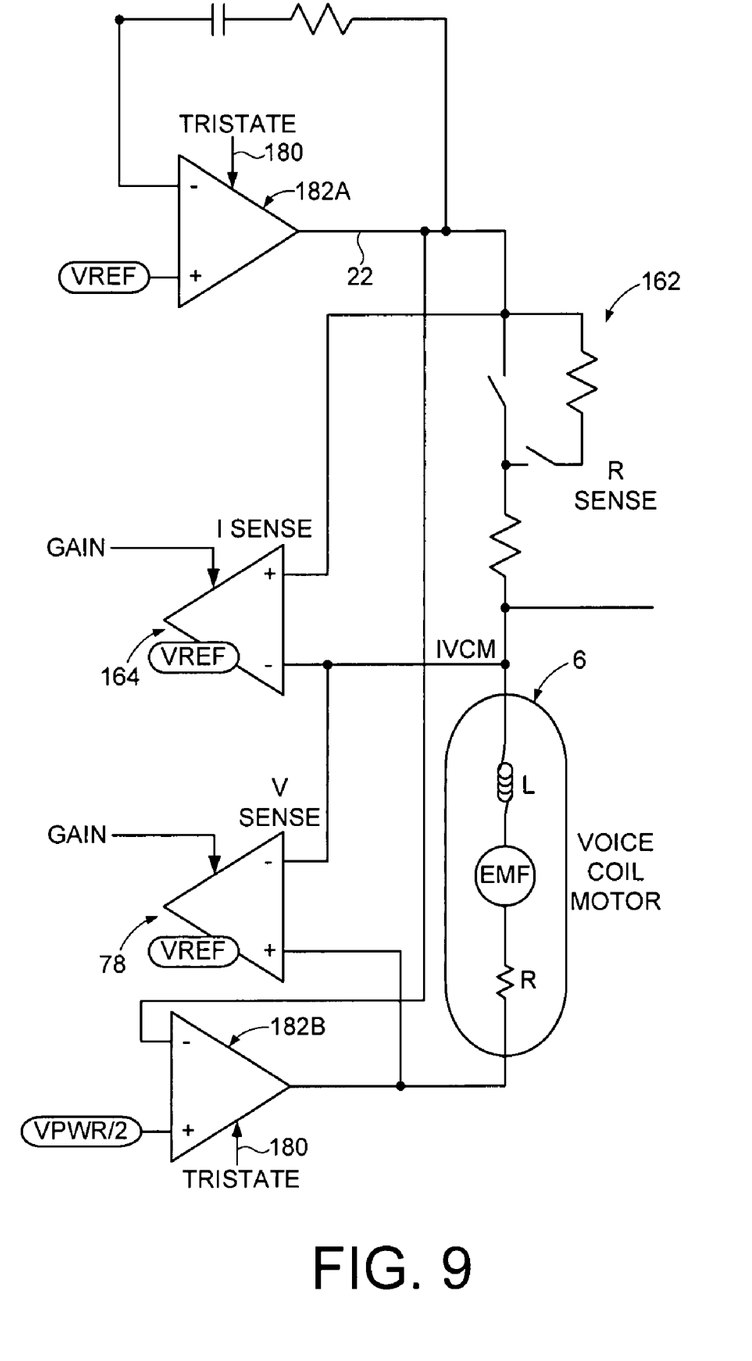
FIG. 9 is a circuit diagram according to an embodiment of the present invention wherein the transient is injected into the detected back EMF voltage by adjusting a sense resistor, or by adjusting a gain of an op-amp.

FIG. 9 shows alternative techniques for injecting a transient into the VCM control loop according to other embodiments of the present invention. For example, in one embodiment the sense resistor 162 of FIG. 8 may comprise a variable resistor as shown in FIG. 9, wherein the transient is injected into the VCM control loop by controlling suitable switches to increase the resistance of the sense resistor 162. In another embodiment, a gain of a selected one of the amplifiers of FIG. 8 is increased, such as the amplifier 164 for detecting the current, or the amplifier 78 for detecting the voice coil voltage.

Any suitable control circuitry 24 may be employed in the embodiments of the present invention, such as any suitable integrated circuit or circuits. For example, the control circuitry 24 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or "system on a chip" (SOC). In addition, the circuitry shown in FIG. 1A may include a suitable power amplifier circuit implemented as a separate integrated circuit, integrated into the read channel or disk controller circuit, or integrated into an SOC.

In one embodiment, the control circuitry 24 comprises a microprocessor executing instructions, the instructions being operable to cause the microprocessor to perform the steps of the flow diagrams described herein. The instructions may be stored in any computer-readable medium. In one embodiment, they may be stored in a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 24 comprises suitable logic circuitry, such as state machine circuitry.

What is claimed is:

1. A disk drive comprising:

a disk;

a head;

a voice coil motor (VCM) comprising a voice coil operable to actuate the head radially over the disk, the voice coil comprising a first end and a second end;

a VCM control loop comprising a voltage detector operable to detect a back EMF voltage across the voice coil, a current detector operable to detect a current flowing through the voice coil, and a control voltage generator, responsive to a command input and the detected back EMF voltage, operable to generate a control voltage applied to the voice coil; and control circuitry operable to:

(a) initialize the control voltage;

(b) inject a transient into the control loop and detect a corresponding current flowing through the voice coil;

(c) adjust the control voltage in response to a polarity of the detected current;

(d) repeat elements (b) and (c) at least once; and (e) store an offset value in response to the adjusted control voltage.

2. The disk drive as recited in claim 1, wherein the control voltage generator is responsive to the stored offset value to generate the control voltage.

3. The disk drive as recited in claim 1, wherein the control circuitry adjusts the control voltage relative to a delta value.

4. The disk drive as recited in claim 3, wherein the control circuitry adjusts the delta value when the polarity of the detected current changes sign.

5. The disk drive as recited in claim 4, wherein the control circuitry decreases the delta value when the polarity of the detected current changes sign.

6. The disk drive as recited in claim 1, wherein the control circuitry injects the transient into the VCM control loop by injecting a transient into the detected back EMF voltage.

7. The disk drive as recited in claim 6, wherein the voltage detector comprises:
    an IR voltage detector, responsive to the detected current, operable to detect a resistive voltage due to a resistance of the voice coil; and
    a voltage compensator for adjusting the detected back EMF voltage in response to the detected resistive voltage;
    wherein the control circuitry injects the transient into the detected back EMF voltage by adjusting the IR voltage detector.

8. The disk drive as recited in claim 7, wherein the IR voltage detector comprises a variable resistor representing a resistance estimate of the voice coil, and the control circuitry injects the transient into the detected back EMF voltage by adjusting the variable resistor.

9. The disk drive as recited in claim 8, wherein the control circuitry injects the transient into the detected back EMF voltage by increasing a resistance of the variable resistor.

10. The disk drive as recited in claim 1, wherein the control circuitry is further operable to tristate the voice coil for a tristate interval after detecting the current flowing through the voice coil.

11. The disk drive as recited in claim 1, wherein the current detector comprises a variable resistor, and the control circuitry injects the transient into the VCM control loop by adjusting the variable resistor.

12. The disk drive as recited in claim 1, wherein the control circuitry injects the transient into the VCM control loop by adjusting a gain of an amplifier.

13. A method of operating a voice coil motor (VCM) control loop in a disk drive, the disk drive comprising a disk, a head, a VCM comprising a voice coil operable to actuate the head radially over the disk, the voice coil comprising a first end and a second end, the method comprising:
    (a) initializing a control voltage applied to the voice coil;
    (b) detecting a back EMF voltage across the voice coil;
    (c) injecting a transient into the VCM control loop and detecting a corresponding current flowing through the voice coil;
    (d) adjusting the control voltage in response to a polarity of the detected current;
    (e) repeating elements (b) through (d) at least once; and
    (f) storing an offset value in response to the adjusted control voltage.

14. The method as recited in claim 13, further comprising generating the control voltage in response to the stored offset value.

15. The method as recited in claim 13, wherein adjusting the control voltage comprises adjusting the control voltage relative to a delta value.

16. The method as recited in claim 15, further comprising adjusting the delta value when the polarity of the detected current changes sign.

17. The method as recited in claim 16, further comprising decreasing the delta value when the polarity of the detected current changes sign.

18. The method as recited in claim 13, wherein injecting the transient into the VCM control loop comprises injecting a transient into the detected back EMF voltage.

19. The method as recited in claim 18, wherein detecting the back EMF voltage comprises:
    detecting a resistive voltage due to a resistance of the voice coil; and
    adjusting the detected back EMF voltage in response to the detected resistive voltage;
    wherein injecting the transient into the detected back EMF voltage comprises adjusting the resistive voltage.

20. The method as recited in claim 19, wherein adjusting the resistive voltage comprises adjusting a variable resistor.

21. The method as recited in claim 20, wherein adjusting the resistive voltage comprises increasing a resistance of the variable resistor.

22. The method as recited in claim 13, further comprising tristating the voice coil for a tristate interval after detecting the current flowing through the voice coil.

23. The method as recited in claim 13, wherein injecting the transient into the VCM control loop comprises adjusting a variable resistor used to detect the current flowing through the voice coil.

24. The method as recited in claim 13, wherein injecting the transient into the VCM control voltage comprises adjusting a gain of an amplifier.

25. A disk drive comprising:
    (a) a disk;
    (b) a head;
    (c) a voice coil motor (VCM) comprising a voice coil operable to actuate the head radially over the disk, the voice coil comprising a first end and a second end;
    (d) a VCM control loop comprising
        a means for detecting a back EMF voltage across the voice coil;
        a means for detecting a current flowing through the voice coil;
        a means for generating a control voltage applied to the voice coil in response to a command input and the detected back EMF voltage;
    (e) a means for initializing the control voltage;
    (f) a means for injecting a transient into the VCM control loop and adjusting the control voltage;
    (g) a means for tristating the voice coil for a tristate interval;
    (h) a means for repeating elements (f) and (g) at least once; and
    (i) a means for storing an offset value in response to the adjusted control voltage.

* * * * *